US007787375B2

(12) United States Patent
Dickens et al.

(10) Patent No.: US 7,787,375 B2
(45) Date of Patent: Aug. 31, 2010

(54) PERFORMING A RECOVERY ACTION IN RESPONSE TO A CREDIT DEPLETION NOTIFICATION

(75) Inventors: Louie Arthur Dickens, Tucson, AZ (US); Roger Gregory Hathorn, Tucson, AZ (US); Nils Haustein, Soergenloch (DE); Craig Athony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/834,636

(22) Filed: Aug. 6, 2007

(65) Prior Publication Data

US 2009/0041057 A1 Feb. 12, 2009

(51) Int. Cl.
*H04L 12/26* (2006.01)
(52) U.S. Cl. .................... 370/231; 370/230; 370/235; 370/229
(58) Field of Classification Search ................. 370/231, 370/234, 232, 235, 230, 229, 236
See application file for complete search history.

(56) References Cited

U.S. PATENT DOCUMENTS

| 4,539,677 | A | * | 9/1985 | Lo ............................. 370/445 |
| 5,072,443 | A | * | 12/1991 | Hahne et al. ................ 370/440 |
| 5,313,454 | A | * | 5/1994 | Bustini et al. ............... 370/231 |
| 5,434,976 | A | * | 7/1995 | Tan et al. .................... 709/234 |
| 5,590,132 | A | * | 12/1996 | Ishibashi et al. ............ 370/236 |
| 5,825,748 | A | * | 10/1998 | Barkey et al. ............... 370/236 |
| 6,044,406 | A | | 3/2000 | Barkey et al. |
| 6,502,189 | B1 | | 12/2002 | Westby |
| 6,553,508 | B1 | | 4/2003 | Minyard |
| 6,715,007 | B1 | * | 3/2004 | Williams et al. ............. 710/52 |
| 6,731,646 | B1 | | 5/2004 | Banks et al. |
| 6,735,174 | B1 | * | 5/2004 | Hefty et al. ................. 370/235 |
| 6,859,437 | B2 | * | 2/2005 | Miller et al. ................ 370/235 |
| 6,922,408 | B2 | | 7/2005 | Bloch et al. |
| 7,035,220 | B1 | * | 4/2006 | Simcoe ....................... 370/236 |
| 7,042,842 | B2 | | 5/2006 | Paul et al. |
| 7,085,846 | B2 | | 8/2006 | Jenne et al. |
| 7,222,784 | B2 | | 5/2007 | Yamaguchi et al. |

(Continued)

OTHER PUBLICATIONS

R. Taborek, "8B10B Transmission Code as a Link Protocol Building Block", Amdahl Corp., Mar. 12, 1996, pp. 1-36.

(Continued)

*Primary Examiner*—Chi H Pham
*Assistant Examiner*—Robert Lopata
(74) *Attorney, Agent, or Firm*—David W. Victor; Konrad Raynes & Victor

(57) ABSTRACT

Provided are a method, system, and program for managing communication between a first device and a second device and performing a recovery action at the second device in response to a credit depletion notification from the first device. The second device assigns credits indicating a number of outstanding frames the first device may transmit to the second device. The second device receives a first type or second type of credit depletion notification from the first device indicating that the first device needs additional credits to transmit further frames to the second device. The second device performs one of a plurality of recovery actions depending on whether the first type or second type of credit depletion notification was received.

24 Claims, 5 Drawing Sheets

U.S. PATENT DOCUMENTS

| | | | |
|---|---|---|---|
| 7,480,730 | B2 | 1/2009 | Stuart et al. |
| 7,490,162 | B1 * | 2/2009 | Masters .................. 709/238 |
| 7,606,150 | B2 * | 10/2009 | Paul et al. ................ 370/229 |
| 7,664,896 | B2 | 2/2010 | Galloway |
| 2002/0089927 | A1 * | 7/2002 | Fischer et al. ........... 370/229 |
| 2004/0076116 | A1 | 4/2004 | Hefty et al. |
| 2004/0156399 | A1 * | 8/2004 | Eran ......................... 370/913 |
| 2005/0018674 | A1 | 1/2005 | Dropps et al. |
| 2005/0076113 | A1 | 4/2005 | Klotz et al. |
| 2005/0088969 | A1 | 4/2005 | Carlsen et al. |
| 2005/0141444 | A1 * | 6/2005 | Hirai ......................... 370/313 |
| 2005/0216783 | A1 | 9/2005 | Sundaram et al. |
| 2006/0026678 | A1 * | 2/2006 | Zakas ......................... 726/22 |
| 2006/0050632 | A1 * | 3/2006 | Griggs ...................... 370/229 |
| 2006/0050639 | A1 | 3/2006 | Stuart et al. |
| 2006/0056292 | A1 * | 3/2006 | Mayhew et al. ......... 370/229 |
| 2006/0062144 | A1 * | 3/2006 | Testa et al. .............. 370/229 |
| 2006/0098681 | A1 | 5/2006 | Cafiero et al. |
| 2007/0147419 | A1 * | 6/2007 | Tsujimoto et al. ....... 370/466 |
| 2007/0189163 | A1 | 8/2007 | Ozawa |
| 2007/0299970 | A1 | 12/2007 | Huang et al. |
| 2008/0032645 | A1 * | 2/2008 | Kim et al. ................ 455/127.1 |
| 2008/0062873 | A1 * | 3/2008 | Semrad et al. ........... 370/232 |
| 2008/0225841 | A1 | 9/2008 | Conway et al. |
| 2008/0232368 | A1 * | 9/2008 | Ikegami et al. .......... 370/390 |
| 2009/0006839 | A1 * | 1/2009 | Matsuoka et al. ....... 713/150 |
| 2009/0010159 | A1 | 1/2009 | Brownell et al. |
| 2009/0022151 | A1 * | 1/2009 | Jeon et al. ................ 370/389 |

OTHER PUBLICATIONS

"Fibre Channel Framing and Signaling-2 (FC-FS-2)", American National Standard for Information Technology, Project T11/1619-D Rev. 1.01, Aug. 8, 2006, pp. 1-417.

"Serial Attached SCSI-2 (SAS-2)", American National Standard, Project T10/1760-D Rev. 7, Nov. 16, 2006, Chapters 4 and 7.

"UNH-IOL Fibre Channel Turorial", InterOperability Laboratory, [online][retrieved Feb. 22, 2007] at http://www.iol.unh.edu/services/testing/fc/training/tutorials/fc_tutorial.php.

"Fibre Channel network protocols", Wikipedia, [online][retrieved Feb. 22, 2007] at http://en.wikipedia.org/wiki/Fibre_Channel_network_protocols.

U.S. Patent application entitled "Credit Depletion Notification for Transmitting Frames Between a Port Pair", Serial No. unknown, filing date Aug. 3, 2007, by inventors L.A. Dickens, G. Hathorn, N. Haustein, C.A. Klein, and D.J. Winarski.

* cited by examiner

PERFORMING A RECOVERY ACTION IN RESPONSE TO A CREDIT DEPLETION NOTIFICATION

BACKGROUND OF THE INVENTION

1. Field of the Invention

The present invention relates to a method, system, and program for performing a recovery action in response to a credit depletion notification.

2. Description of the Related Art

Devices in a network, such as a Storage Area Network (SAN) communicate frames to each other via ports. Certain network components, such as SAN switches and edge devices use a buffer-to-buffer credit management technique, defined in the fibre channel protocol specification, where credit is assigned to a connected remote transmitting port indicating a number of frames the transmitting port may have outstanding to the receiving port before the receiving port indicates it has additional buffer space available. The credit value may indicate the number of buffers that are allocated by the receiving port for use to store frames sent by the sending port. Credit is given to account for the lag time between when a frame is sent, the frame is captured by the receiving port, stored in a buffer, processed, said buffer freed, and a signal is sent from the receiving port to the transmitting port indicating that the buffer is again available. Because the transmitting port has credit, it may send a number of outstanding frames corresponding to the credit value before the transmitting port must wait to receive additional credit.

Whenever the transmitting port sends a frame, the transmitting port decrements the port pair credit and upon receiving a receiver-ready (R_RDY) ordered set, as known in the art, indicating that the receiving port processed the frame, increments the credit. In current art, the transmitting port may occasionally consume all of the credit and be unable to transfer frames. This may occur, for instance, if there are network transmission errors that corrupt the R_RDY ordered sets, preventing the transmitting port from receiving them. Another potential cause arises when the credit amount assigned to a transmitting port is not enough to allow maximum throughput because there are too many frames in flight, meaning that the credit is used faster than it can be replenished. In this circumstance, performance can be approved by allocating more buffer space, and hence more credit, to an especially busy port, but there is currently no way to detect when a port is running out of credit.

If the transmitting port no longer has any credit, the transmitting port cannot send any frames and must wait for either an R_RDY or a timeout condition and link recovery. If there is no indication that the transmitting port is out of credit, the problem may not be easily recognized by the receiving port, nor the system, and may remain uncorrected.

SUMMARY

Provided are a method, system, and program for managing communication between a first device and a second device and performing a recovery action at the second device in response to a credit depletion notification from the first device. The second device assigns credits indicating a number of outstanding frames the first device may transmit to the second device. The second device receives a first type or second type of credit depletion notification from the first device indicating that the first device needs additional credits to transmit further frames to the second device. The second device performs one of a plurality of recovery actions depending on whether the first type or second type of credit depletion notification was received.

DETAILED DESCRIPTION

Figure 1:
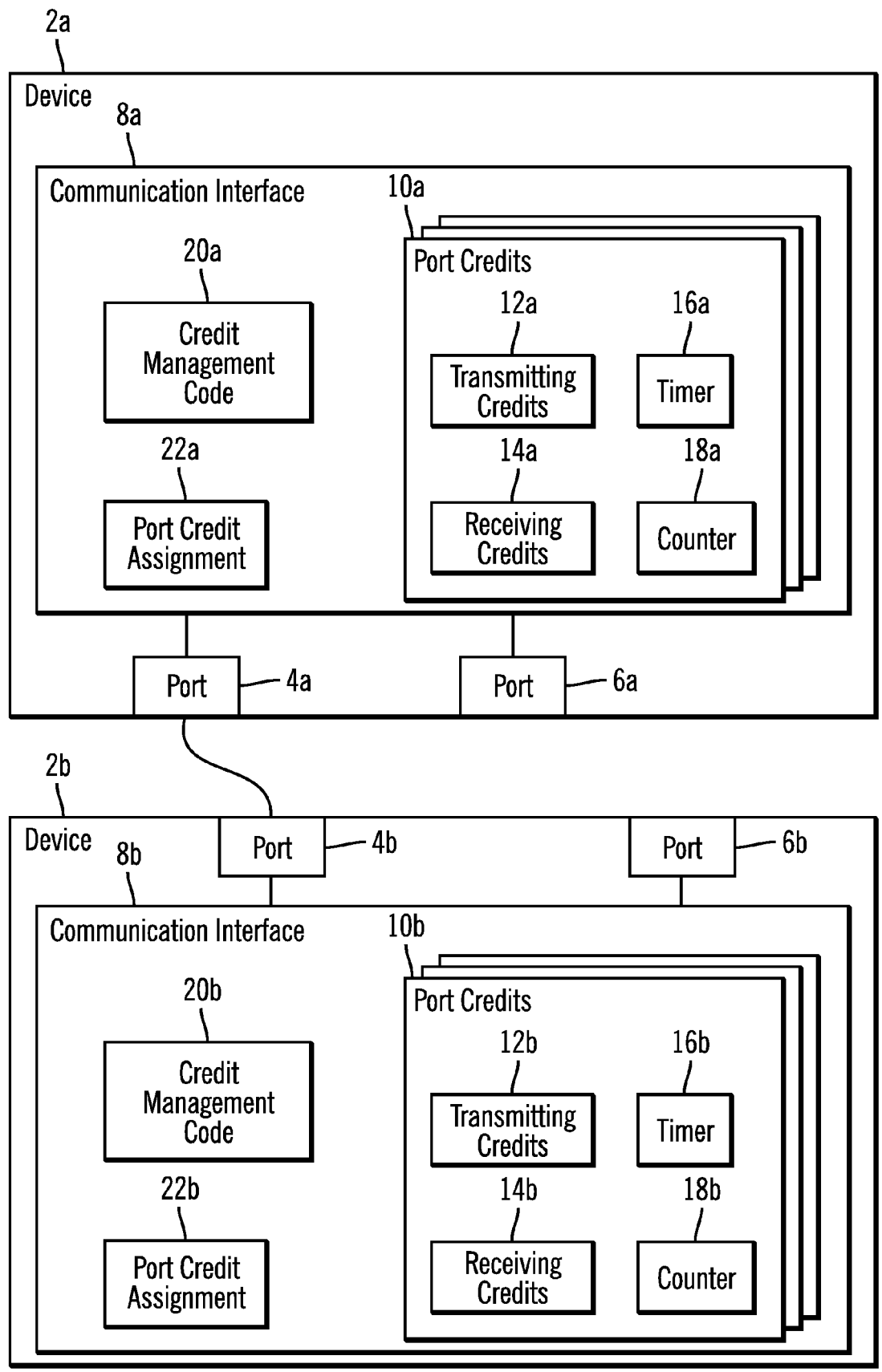
FIG. 1 illustrates an embodiment of connected devices in a computing environment.

FIG. 1 illustrates an embodiment of a network computing environment. Two devices 2a, 2b are connected via communication ports 4a, 4b. The devices may (or may not) include additional ports 6a, 6b to connect to the same or different devices (not shown). Each device 2a, 2b includes a communication interface 8a, 8b, such as a network adaptor card, that enables communication with other connected devices. In FIG. 1, the devices 2a, 2b are connected in a point-to-point topology. In additional embodiments, the devices 2a, 2 may be connected in an arbitrated loop topology or connected to a frame-switched network (fabric). Each device 2a, 2b maintains port credits 10a, 10b for each port pair for a local port on the device 2a, 2b and a remote port to which that local port connects. The port credit 10a, 10b information for a local-remote port pair provides information on credits, where a credit value indicates the number of frames a transmitting port may transmit to a receiving port without receiving credit replenishment notification, such as an R_RDY ordered set. Each local port 4a, 4b, 6a, 6b may operate as a transmitting port and receiving port with respect to a connected remote port for which the port credit information 8a, 8b is provided. One local port may connect to one remote port.

The port credit 10a, 10b information for one remote-local port pair includes transmitting credits 12a, 12b indicating a number of frames the local port may transmit to the remote port in the port pair for which the information is provided. The credits are initially assigned by the remote port to receive the frames during the login process. Whenever a frame is sent from the local transmitting port to the remote receiving port, the transmitting credits 12a, 12b are decremented. The transmitting credits 12a, 12b are incremented when the transmitting port receives a ready code, such as a R_RDY code in the Fibre Channel protocol, indicating that the remote port has processed a transmitted frame, such as completed processing the frame in the communication interface 8a, 8b, freed a receive buffer, and is ready to receive a further frame. The receiving credits 14a, 14b indicate a number of credits that should be maintained at the remote port. When the local port 4a, 4b, 6a, 6b receives a transmitted frame, the receiving credits 14a, 14b are decremented indicating that the remote transmitting port has consumed a unit of credit to transmit the received frame.

The port credit 10a, 10b information for a local-remote port pair further includes a timer 16a, 16b and a counter 18a, 18b that are used to determine whether a transmitting port should notify the receiving port of a depletion of buffer credits. In one embodiment, this notification may comprise sending an ordered set indicating that credit has been depleted for the local-remote port pair.

The communication interface 8a, 8b further includes credit management code 20a, 20b implemented in hardware and/or computer executable code to manage the credits and perform the credit related transmission and receiving operations. The credit management code 20a, 20b further maintains a port credit assignment 22a, 22b indicating an assignment of credits assigned to a local-remote port pair indicating the number of outstanding frames the remote port may transmit to the local port. During initialization, which may occur during a port login process in certain embodiments, the receiving credits 14a for a local-remote port pair are set to the number of assigned credits for that local-remote port pair and the number of assigned credits is transferred to the remote port, such that the remote port's transmitting credits 12a, 12b are set to the number of assigned credits. Thus, each port 4a, 4b, 6a, 6b is assigned transmitting credits 12a, 12b from a remote port indicating a number of transmitted frames the port may have outstanding to the remote port.

The devices 2a, 2b may connect to each other using different device or network communication protocols known in the art, such as Fibre Channel, Ethernet, Small Computer System Interface (SCSI), Serial Attached SCSI (SAS), etc. The devices 2a, 2b may be part of a network, such as a Storage Area Network (SAN), Local Area Network (LAN), Intranet, the Internet, Wide Area Network (WAN), peer-to-peer network, wireless network, arbitrated loop network, etc. The devices 2a, 2b may comprise computational devices known in the art that communicate over a network, such as a host, server, switch, repeater, expander, transmitter, printer, storage device, etc.

The term "frame" may comprise any type of data unit or packet that is used to transmit data from one port to another according to the utilized communication protocol. For instance, a frame may include parity and header information. In certain embodiments, such as Fibre Channel implementations, a frame may include a Start-of-Frame, an End-of-Frame, CRC, a header, and data, status, or commands, etc.

Figure 2:
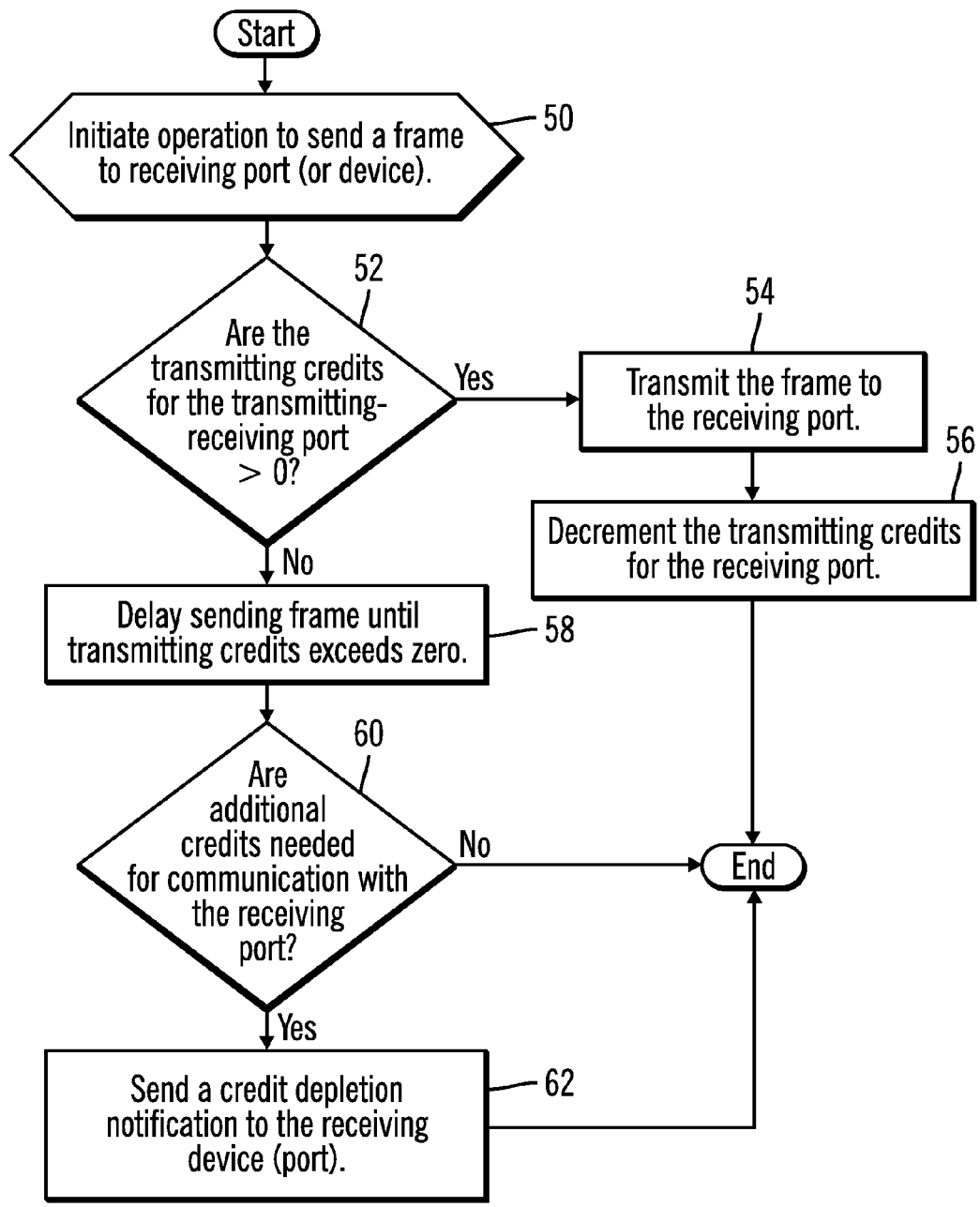
FIG. 2 illustrates an embodiment of operations for a transmitting port to send a frame to a receiving port.

FIG. 2 illustrates an embodiment of operations performed by the credit management code 20a, 20b for a transmitting port 4a, 4b, 6a, 6b sending frames to a receiving port in a port pair. Upon initiating (at block 50) an operation to send a frame to a receiving port (or device), the credit management code 20a, 20b determines (at block 52) whether the transmitting credits 12a, 12b for the local-remote port pair for the receiving port indicate that no further transmissions to the receiving port 4a, 4b, 6a, 6b are permitted. In one embodiment, the transmitting credits 12a, 12b indicate that no transmissions are permitted if the credit value is zero or some other threshold value. If (at block 52) the transmitting credits 12a, 12b indicate that a further frame may be transmitted (e.g., the credits are greater than zero), then the frame is transmitted (at block 54) to the receiving port via the local or transmitting port. The transmitting credits 12a, 12b for the local-remote port pair 10a, 10b are decremented (at block 56).

If (at block 52) the number of transmitting credits 12a, 12b indicates that no further frames may be transmitted between the local-remote port pairs (e.g., the transmitting credit 12a, 12b is zero), then the credit management code 20a, 20b delays (at block 58) sending the frame until the transmitting credits 12a, 12b indicate frames may be transmitted, e.g., exceeds zero. The credit management code 20a, 20b determines (at block 60) whether additional credit is needed for communication between the transmitting and receiving port, i.e., local-remote port pair. If (at block 60) additional transmitting credit is determined to be needed, then the credit management code 20a, 20b sends (at block 62) a credit depletion notification. In one embodiment, the credit depletion notification may comprise an ordered set sent to the receiving device (port) notifying the receiving port that the transmitting port is out of credit. In embodiments where the credit depletion notification code is an ordered set and not a frame, the ordered set may be sent even if the transmitting credits 12a, 12b indicate no more frames may be transmitted between the local-remote port pair, e.g., credit is zero.

In one embodiment, the credit depletion notification ordered set may be transmitted in lieu of the IDLE ordered set for three instances of the credit depletion notification ordered set between the local and remote ports when no data is being transmitted to maintain synchronization. In a second embodiment, the credit depletion notification ordered set may be continuously transmitted in lieu of the IDLE ordered set. The credit management code 20a, 20b for the receiving port may recognize this as the ordered set comprising a notification to the receiving port that the transmitting port is out of credit for the local-remote pair. In a Fibre Channel embodiment, the credit depletion notification ordered set may consist of a K28.5 character with three data characters following, such as K28.5-D21.5-D21.5-D21.4. If the transmitting device supports this special notification, but the receiving device does not, then the credit management code 20a, 20b at the receiving port will not take any action and, instead view the special code as an alternative to the IDLE transmission to maintain bit synchronization. If (at block 60) additional transmitting credits 12a, 12b are not needed, control ends.

Figure 3:
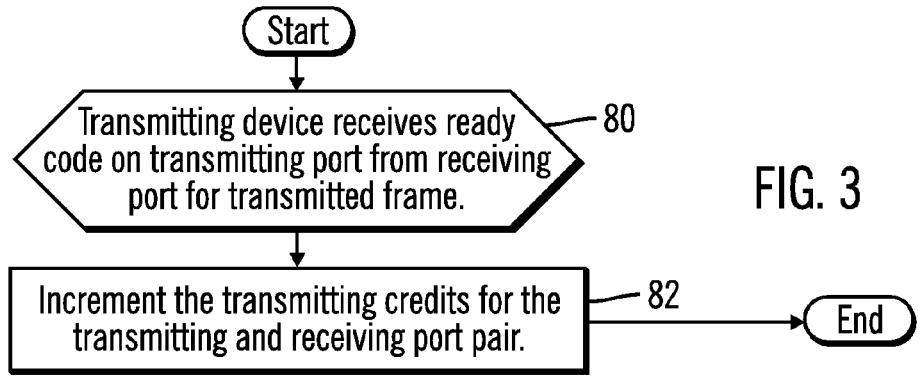
FIG. 3 illustrates an embodiment of operations performed when the transmitting port receives a ready code indicating that a transferred frame was processed and the buffer is available.

FIG. 3 illustrates an embodiment of operations performed by the credit management code 20a, 20b upon receiving a ready code, which in certain Fibre Channel embodiments may comprise an R_RDY ordered set on a receiving port for a transmitted frame. Upon receiving (at block 80) the ready code (e.g., R_RDY ordered set), the credit management code 20a, 20b increments (at block 82) the transmitting credits 12a, 12b for the transmitting and receiving port pair 10a, 10b. In certain embodiments, the transmitting credits 12a, 12b may be incremented by one to indicate that one additional frame may be outstanding to the receiving port.

Figure 4:
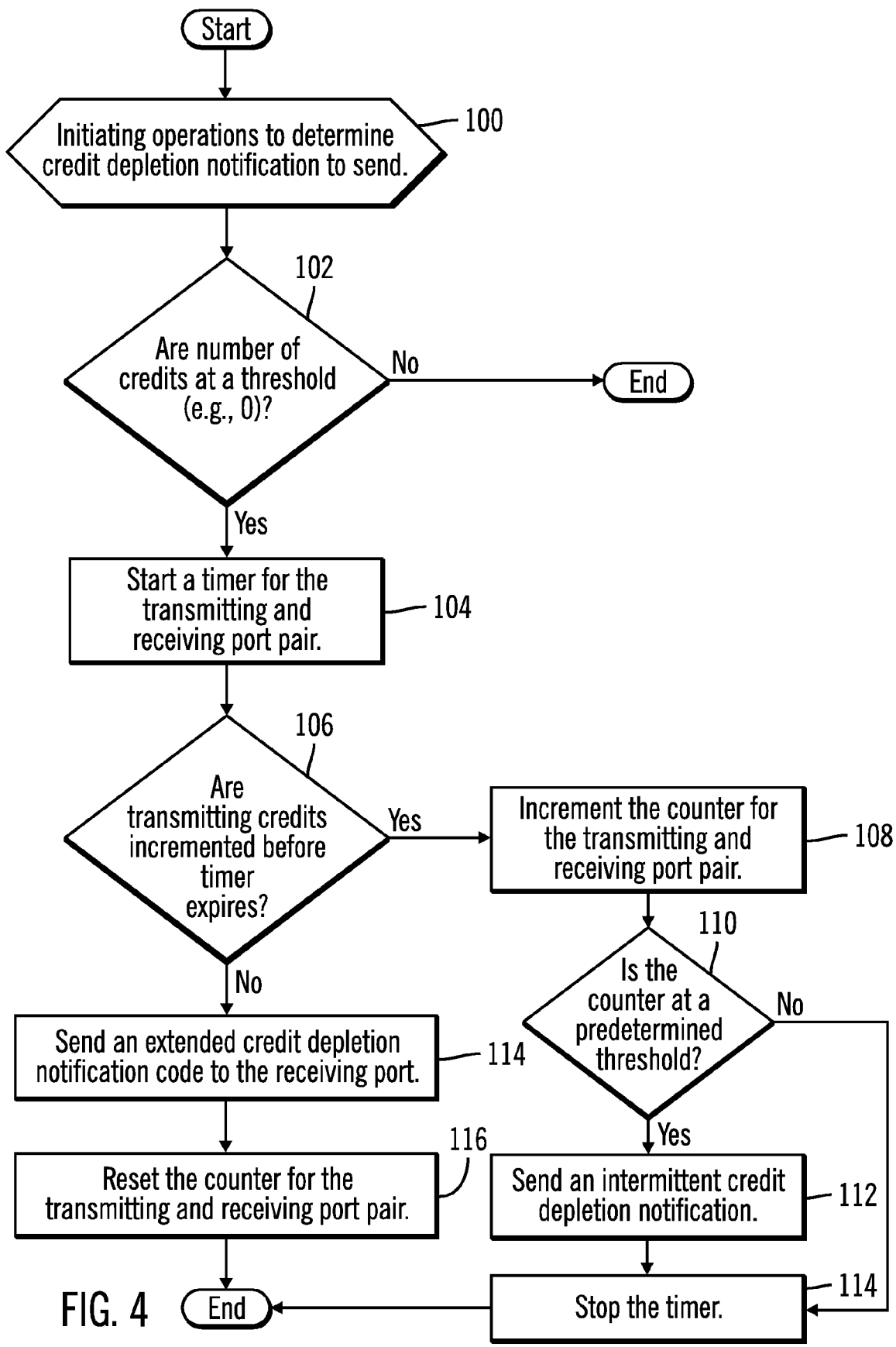
FIG. 4 illustrates an embodiment of operations to determine whether additional credits are needed for a transmitting-receiving port pair.

FIG. 4 illustrates an embodiment of operations performed by the credit management code 20a, 20b for the transmitting side of the port to determine (at block 100) the type of credit depletion notification to send. The operations of FIG. 4 may be performed at block 60 in FIG. 2. The operations of FIG. 4 may be initiated in response to determining that there are no available credits to send a frame or after sending a frame and decrementing the transmitting credits 12a, 12b to zero. Upon initiating (at block 100) the determination operations, the credit management code 20a, 20b determines (at block 102) whether the transmitting credits 12a, 12b for the transmitting and receiving port pair 10a, 10b are at a threshold indicating that no more frames may be transmitted, such as zero. If so, then the credit management code 20a, 20b starts (at block 104) a timer 16a, 16b for the transmitting-receiving port pair to time the duration during which the transmitting credits 12a, 12b for the port pair remains zero, or indicates that no frames may be transmitted. If (at block 102) the transmitting credits 12a, 12b indicate that more frames may be outstanding, then control ends.

If (at block 106) the transmitting credits 12a, 12b are incremented before the timer 16a, 16b expires, then the counter 18a, 18b for the transmitting and receiving port pair is incremented (at block 108). In this way, the counter 18a, 18b indicates the number of consecutive times the timer 16a, 16b was started without expiring. The timer 16a, 16b may be prevented from expiring due to an intervening ready code (e.g., R_RDY ordered set) from the receiving port, resulting in the incrementing of the transmitting credits 12a, 12b. If (at block 110) the counter 18a, 18b is at a threshold number, then an intermittent credit depletion notification, which in certain embodiments may comprise a credit depletion ordered set (K28.5-D21.5-D21.4-D21.5), is sent (at block 112) to the receiving port 4a, 4b, 6a, 6b to notify the receiving port that a condition exists such that amount of transmission credit is being intermittently driven to zero, thereby preventing the transmission of further frames. Further, the timer 16a, 16b is stopped (at block 114) upon receiving the ready code (e.g., R_READY ordered set) from the receiving port.

If (at block 106) the transmitting credits 12a, 12b are not incremented before the timer 16a, 16b expires, resulting in the expiration of the timer 16a, 16b, then the credit management code 20a, 20b sends (at block 114) an extended credit depletion notification code indicating that credit has been depleted for a threshold amount of time. In such case, more credit may be needed because credit has been unavailable for a threshold predetermined time and communication has stopped. At this point, the counter 18a, 18b for the transmitting and receiving port pair 10a, 10b may be reset (at block 116).

With the operations of FIG. 4, different credit depletion notifications indicating that credit has been depleted, e.g., different ordered sets indicating different credit information, are sent to the receiving port based on different credit depletion events. An extended credit depletion notification indicates a first credit depletion event where credit has been zero for a predetermined time and an intermittent credit depletion notification indicates a second credit depletion event where credit has intermittently been zero for less than the predetermined time a predetermined number of times. In further embodiments, different credit depletion events resulting in the depletion of the transmitting credit 12a, 12b may be considered to determine the type of credit depletion notification, e.g., ordered set, to send to the receiving port to notify of a depleted credit condition. The specific credit depletion notification conveys information to the receiving port on the situation or event that is triggering the notification of the credit depletion.

Figure 5:
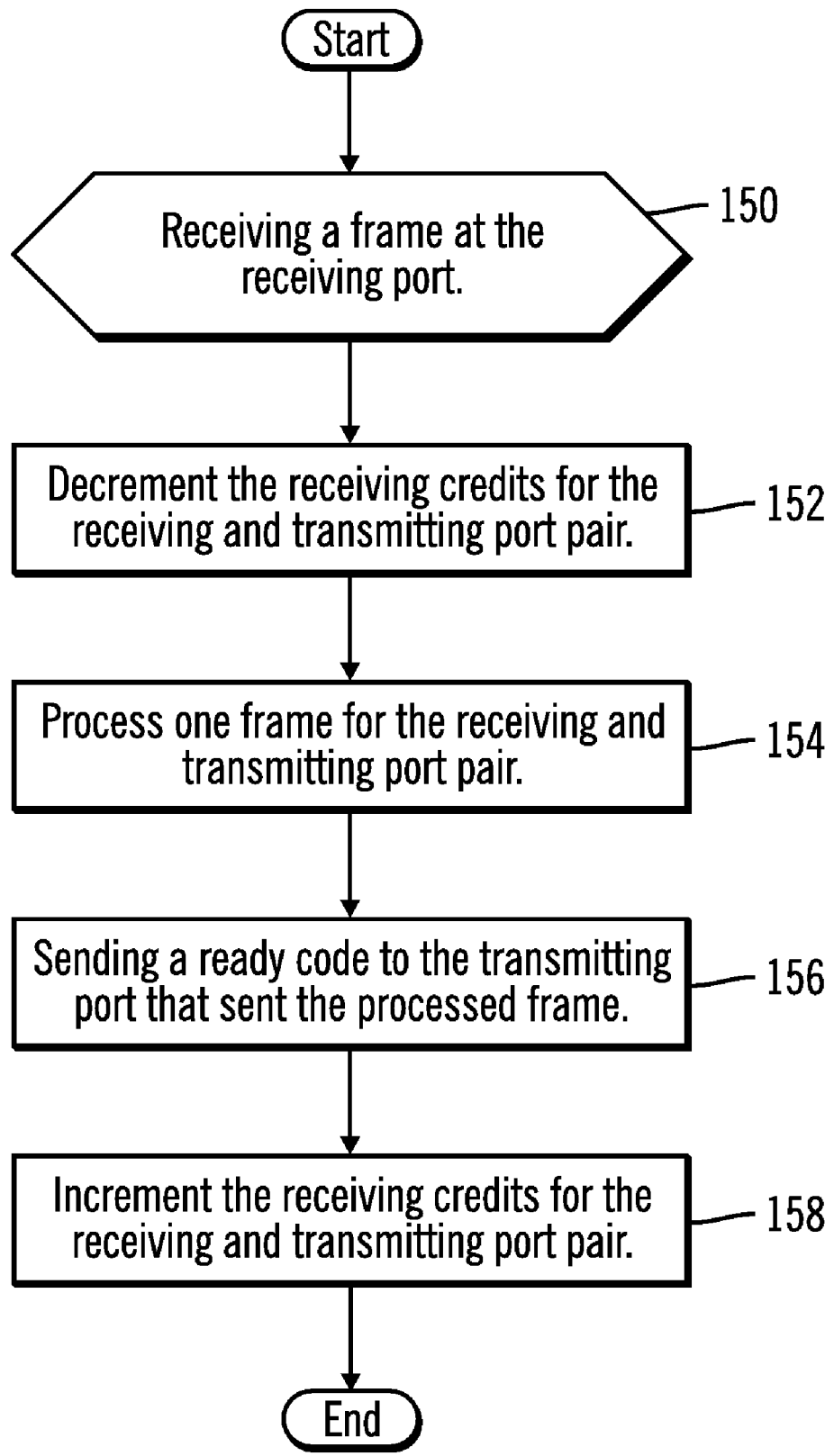
FIG. 5 illustrates an embodiment of operations to process a frame received at a receiving port.

FIG. 5 illustrates an embodiment of operations performed by the credit management code 20a, 20b for the receiving port in a receiving-transmitting port pair 10a, 10b. Upon receiving (at block 150) a frame at a receiving port from a transmitting port, the receiving credits 14a, 14b for the receiving and transmitting port pair are decremented (at block 152). The receiving credits 14a, 14b indicate to the receiving port how much transmitting credit 12a, 12b should be maintained at the transmitting port at the remote device 2a, 2b. Upon processing (at block 154) one frame for the receiving and transmitting port pair, a ready code, e.g., an R_RDY ordered set, is sent (at block 156) to the transmitting port that sent the processed frame to cause the transmitting credits 12a, 12b at the remote transmitting port to be incremented. The processing of the frame may comprise processing the frame, freeing the buffer used for the frame, and being otherwise ready to receive a next frame. The receiving credits 14a, 14b are incremented (at block 158) for the receiving and transmitting port pair because the ready code (e.g., R_RDY ordered set), received at the transmitting port 4a, 4b, 6a, 6b will cause the incrementing of the transmitting credits 12a, 12b. With these operations, the receiving credits 14a, 14b reflect the number of transmitting credits 12a, 12b that should be available at the remote device for the port pair.

Figure 6:
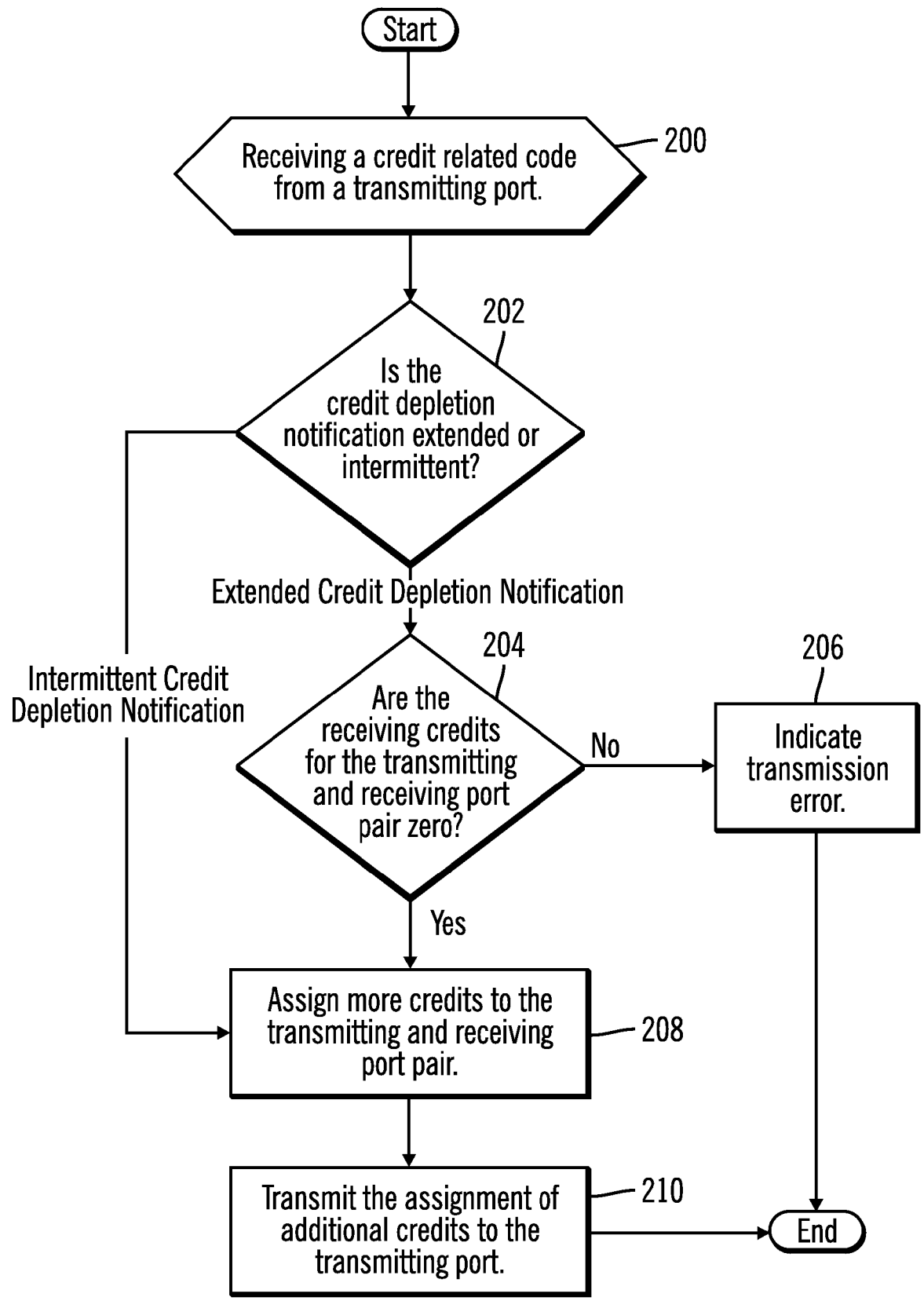
FIG. 6 illustrates an embodiment of operations to process a credit related code received at a receiving port.

FIG. 6 illustrates an embodiment of operations performed by the credit management code 20a, 20b for the receiving port to respond to a transmitting port credit depletion notification by determining one of a plurality of recovery actions to perform. The received credit depletion notification may be communicated according to the operations described in FIG. 4, where an extended credit depletion notification (e.g., ordered set) indicates if the available transmitting credits 12a, 12b have been zero (or indicating no frame may be sent) for a predetermined time and an intermittent credit depletion notification (e.g., ordered set) indicates that the transmitting credits 12a, 12b have reached zero a number of times for a duration less than the predetermined time. Upon receiving (at block 200) one of these credit depletion notifications (e.g., ordered sets from the transmitting port), if (at block 202) received notification is the extended credit depletion notification (indicating that the transmitting credits 12a, 12b have been zero for the predetermined time of the timer 16a, 16b), then the credit management code 20a, 20b determines (at block 204) whether the receiving credits for the transmitting and receiving port pair is zero (or indicates that no frames may be transmitted). If the receiving credits 14a, 14b do not confirm that the transmitting credits 12a, 12b are zero, then there must be a communication error because the transmitting port did not receive the ready codes (e.g., R_RDY ordered sets) that would have incremented the transmitting credits 12a, 12b to a value equal to the current non-zero receiving credits 14a, 14b. In the case of such a discrepancy, the credit management code 20a, 20b performs a recovery action that indicates (at block 206) a transmission error due to the failure of the ready codes to reach or effect the remote device 2a, 2b to increment the transmitting credits 12a, 12b.

If (at block 204) the receiving credits 14a, 14b confirm the zero value of the transmitting credits 12a, 12b indicated by the extended credit depletion notification, then the recovery action may involve assigning more credits to the transmitting-receiving port pair because the transmitting port consumed all the credits for a threshold predetermined time. In such case, the credit management code 20a, 20b may perform a recovery action that modifies the port credit assignment information 22a, 22b to assign (at block 208) additional credits to the transmitting-receiving port pair to avoid credits running out for this pair. The assigned additional credits are transmitted (at block 210) to the transmitting port 4a, 4b, 6a, 6b. In certain embodiments, this may be accomplished via logout/login with a higher initial credit, or by some other means consistent with the prior art. Further, if (at block 202) the intermittent credit depletion notification is received (indicating that credits run-out for less than the predetermined threshold a threshold number of times), then the recovery action may optionally assign additional credit to the transmitting and receiving port pair to avoid the transmitting port consuming all credit.

Described embodiments provide techniques for a transmitting port to determine whether additional credits are needed and to communicate the need for more credits in situations where no further frames may be transmitted from the transmitting port to the receiving port, such as when no credits are available. Further, described embodiments provide techniques for the receiving port to determine the recover action to perform in response to receiving one of different types of notifications, which may indicate whether the transmitting port requires additional credit or whether there is some transmission or network error preventing the transmitting port from receiving a ready code in response to transmitting a frame.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The described embodiments discuss different types of credit depletion notifications and recovery actions to perform in response to the different types of notifications. In additional embodiments, there may be additional types of credit depletion notifications and recovery actions in addition to those described.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices and components that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 2-6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing communication between a first device and a second device, wherein the second device performs:

assigning credits indicating a number of outstanding frames the first device is permitted to transmit to the second device;

receiving a first type of credit depletion notification from the first device indicating that the first device needs additional credits to transmit further frames to the second device;

receiving a second type of credit depletion notification from the first device indicating that the first device needs additional credits to transmit further frames to the second device;

performing a first recovery action in response to receiving the first type of credit depletion notification; and performing a second recovery action in response to receiving the second type of credit depletion notification, wherein the first and second recovery actions comprise different operations.

2. The method of claim 1, wherein the second device further performs:
maintaining receiving credits indicating the number of outstanding frames the first device may transmit to the second device;
decrementing the receiving credits in response to the second device receiving a transmitted frame from the first device;
incrementing the receiving credits in response to the second device processing the transmitted frame; and
using the receiving credits and the credit depletion notification type to determine the recovery action operations to perform.

3. The method of claim 2, wherein using the receiving credits and the credit depletion notification type to determine the recovery action operations to perform comprises:
determining whether the receiving credits are zero in response to receiving the first type of credit depletion notification, wherein the performed first recovery action operations comprise indicating a transmission error in response to determining that the receiving credits are greater than zero.

4. The method of claim 3, wherein the performed first recovery action operations comprise assigning additional credits to the first device to transmit frames in response to determining that the receiving credits are zero.

5. The method of claim 2, wherein using the receiving credits and the credit depletion notification type comprises using the value of the receiving credits to determine whether to assign additional credits to the first device in response to receiving the first type of credit depletion notification, and
wherein the performed second recovery action operations comprise assigning additional credits to the first device to transmit frames in response to receiving the second type of credit depletion notification.

6. The method of claim 2, wherein the first type of credit depletion notification indicates that credits have remained depleted at the first device for a threshold time, wherein using the receiving credits and the credit depletion notification type to determine the first recovery action operations to perform comprises assigning additional credits to the first device to transmit frames in response to receiving the first type of credit depletion notification and determining that the receiving credits are zero.

7. The method of claim 6, wherein using the receiving credits and the credit depletion notification type to determine the first recovery action operations to perform comprises indicating a communication error in response to receiving the first type of credit depletion notification and determining that the receiving credits are greater than zero.

8. The method of claim 1, wherein the second type of credit depletion notification indicates that credits have remained depleted at the first device less than a threshold time for a threshold number of times, and wherein the second recovery action performed comprises assigning additional credits to the first device to transmit frames in response to receiving the second type of credit depletion notification.

9. A system in communication with a transmitting device, comprising:
a receiving device receiving frames transmitted from the transmitting device; and
credit management code enabled to cause operations, the operations comprising:
assigning credits indicating a number of outstanding frames the transmitting device is permitted to transmit to the receiving device;
receiving a first type of credit depletion notification from the transmitting device indicating that the transmitting device needs additional credits to transmit further frames to the receiving device;
receiving a second type of credit depletion notification from the transmitting device indicating that the transmitting device needs additional credits to transmit further frames to the receiving device;
performing a first recovery action in response to receiving the first type of credit depletion notification; and
performing a second recovery action in response to receiving the second type of credit depletion notification, wherein the first and second recovery actions comprise different operations.

10. The system of claim 9, wherein the operations further comprise:
maintaining receiving credits indicating the number of outstanding frames the transmitting device may transmit to the receiving device;
decrementing the receiving credits in response to receiving a transmitted frame from the transmitting device;
incrementing the receiving credits in response to processing the transmitted frame; and
using the receiving credits and the credit depletion notification type to determine the recovery action operations to perform.

11. The system of claim 10, wherein using the receiving credits and the credit depletion notification type to determine the recovery action operations to perform comprises:
determining whether the receiving credits are zero in response to receiving the first type of credit depletion notification, wherein the performed first recovery action operations comprise indicating a transmission error in response to determining that the receiving credits are greater than zero.

12. The system of claim 11, wherein the performed first recovery action operations comprise assigning additional credits to the transmitting device to transmit frames in response to determining that the receiving credits are zero.

13. The system of claim 10, wherein using the receiving credits and the credit depletion notification type comprises using the value of the receiving credits to determine whether to assign additional credits to the transmitting device in response to receiving the first type of credit depletion notification, and
wherein the performed second recovery action operations comprise assigning additional credits to the transmitting device to transmit frames in response to receiving the second type of credit depletion notification.

14. The system of claim 10, wherein the first type of credit depletion notification indicates that credits have remained depleted at the transmitting device for a threshold time, wherein using the receiving credits and the credit depletion notification type to determine the first recovery action operations to perform comprises assigning additional credits to the transmitting device to transmit frames in response to receiving the first type of credit depletion notification and determining that the receiving credits are zero.

15. The system of claim 14, wherein using the receiving credits and the credit depletion notification type to determine the first recovery action operations to perform comprises indicating a communication error in response to receiving the first type of credit depletion notification and determining that the receiving credits are greater than zero.

16. The system of claim 9, wherein the second type of credit depletion notification indicates that credits have remained depleted at the transmitting device less than a threshold time for a threshold number of times, and wherein the second recovery action performed comprises assigning additional credits to the transmitting device to transmit frames in response to receiving the second type of credit depletion notification.

17. An article of manufacture being a non-transitory computer readable medium storing computer executable code for managing communication between a first device and a second device, wherein the code causes the second device to perform operations, the operations comprising:

assigning credits indicating a number of outstanding frames the first device is permitted to transmit to the second device;

receiving a first type of credit depletion notification from the first device indicating that the first device needs additional credits to transmit further frames to the second device;

receiving a second type of credit depletion notification from the first device indicating that the first device needs additional credits to transmit further frames to the second device;

performing a first recovery action in response to receiving the first type of credit depletion notification; and performing a second recovery action in response to receiving the second type of credit depletion notification wherein the first and second recovery actions comprise different operations.

18. The article of manufacture of claim 17, wherein the operations further comprise:

maintaining receiving credits indicating the number of outstanding frames the first device may transmit to the second device;

decrementing the receiving credits in response to the second device receiving a transmitted frame from the first device;

incrementing the receiving credits in response to the second device processing the transmitted frame; and using the receiving credits and the credit depletion notification type to determine the recovery action operations to perform.

19. The article of manufacture of claim 18, wherein using the receiving credits and the credit depletion notification type to determine the recovery action operations to perform comprises:

determining whether the receiving credits are zero in response to receiving the first type of credit depletion notification, wherein the performed first recovery action operations comprise indicating a transmission error in response to determining that the receiving credits are greater than zero.

20. The article of manufacture of claim 19, wherein the performed first recovery action operations comprise assigning additional credits to the first device to transmit frames in response to determining that the receiving credits are zero.

21. The article of manufacture of claim 18, wherein using the receiving credits and the credit depletion notification type comprises using the value of the receiving credits to determine whether to assign additional credits to the first device in response to receiving the first type of credit depletion notification, and wherein the performed second recovery action operations comprise assigning additional credits to the first device to transmit frames in response to receiving the second type of credit depletion notification.

22. The article of manufacture of claim 18, wherein the first type of credit depletion notification indicates that credits have remained depleted at the first device for a threshold time, wherein using the receiving credits and the credit depletion notification type to determine the first recovery action operations to perform comprises assigning additional credits to the first device to transmit frames in response to receiving the first type of credit depletion notification and determining that the receiving credits are zero.

23. The article of manufacture of claim 22, wherein using the receiving credits and the credit depletion notification type to determine the first recovery action operations to perform comprises indicating a communication error in response to receiving the first type of credit depletion notification and determining that the receiving credits are greater than zero.

24. The article of manufacture of claim 17, wherein the second type of credit depletion notification indicates that credits have remained depleted at the first device less than a threshold time for a threshold number of times, and wherein the second recovery action performed comprises assigning additional credits to the first device to transmit frames in response to receiving the second type of credit depletion notification.

* * * * *